(12) United States Patent
Christoph

(10) Patent No.: US 10,930,297 B2
(45) Date of Patent: Feb. 23, 2021

(54) ACOUSTIC ECHO CANCELING

(71) Applicant: HARMAN BECKER AUTOMOTIVE SYSTEMS GmbH, Karlsbad-Ittersbach (DE)

(72) Inventor: Markus Christoph, Straubing (DE)

(73) Assignee: HARMAN BECKER AUTOMOTIVE SYSTEMS GmbH, Karlsbad-Ittersbach (DE)

( * ) Notice: Subject to any disclaimer, the term of this patent is extended or adjusted under 35 U.S.C. 154(b) by 0 days.

(21) Appl. No.: 16/473,574

(22) PCT Filed: Dec. 8, 2017

(86) PCT No.: PCT/EP2017/081942
§ 371 (c)(1),
(2) Date: Jun. 25, 2019

(87) PCT Pub. No.: WO2018/121971
PCT Pub. Date: Jul. 5, 2018

(65) Prior Publication Data
US 2020/0160876 A1 May 21, 2020

(30) Foreign Application Priority Data
Dec. 30, 2016 (EP) .................................. 16207449

(51) Int. Cl.
*G10L 21/02* (2013.01)
*G10L 21/0232* (2013.01)
(Continued)

(52) U.S. Cl.
CPC .......... *G10L 21/0232* (2013.01); *G06F 3/165* (2013.01); *G10L 25/18* (2013.01); *H04M 9/082* (2013.01); *G10L 2021/02082* (2013.01)

(58) Field of Classification Search
CPC ................. G10L 21/0232; G10L 25/18; G10L 2021/02082; G10L 21/0264; G10L 21/02;
(Continued)

(56) References Cited

U.S. PATENT DOCUMENTS 5,680,467 A * 10/1997 Hansen ................ H04R 25/453
381/312
6,925,176 B2 * 8/2005 Myllyla ................ H04M 9/082
379/406.05

(Continued)

OTHER PUBLICATIONS

International Search Report for Application No. PCT/EP2017/081942, dated Jan. 16, 2018, 10 pages.
(Continued)

*Primary Examiner* — Disler Paul
(74) *Attorney, Agent, or Firm* — Artegis Law Group, LLP

(57) ABSTRACT

Canceling acoustic echoes includes picking up with a microphone sound generated by a sound source and transferred from the sound source to the microphone via an unknown transfer path having an unknown transfer function, and providing an electrical microphone signal therefrom. It further includes approximating the unknown transfer function with an estimated transfer function of an adaptive filter and filtering an electrical signal representative of the sound generated by the sound source with the estimated transfer function to provide an estimated signal therefrom, the adaptive filter having an adaptive adaptation step size. It further includes filtering a difference signal, which is the difference between the microphone signal and the estimated signal, with a post filter transfer function of an adaptive post filter. The post filter transfer function is the difference between one and the adaptive adaptation step size, and the adaptive post filter is configured to have a minimum damping, the minimum damping being limited to a minimum threshold.

22 Claims, 3 Drawing Sheets

(51) Int. Cl.
*G06F 3/16* (2006.01)
*G10L 25/18* (2013.01)
*H04M 9/08* (2006.01)
*G10L 21/0208* (2013.01)

(58) Field of Classification Search
CPC .... H04M 9/082; H04M 1/6041; H04M 3/002; H04M 3/568; H04R 3/002; H04R 3/02; H04R 2227/007; H04B 3/20
USPC .................................. 381/66, 83, 93, 95–96
See application file for complete search history.

(56) References Cited

U.S. PATENT DOCUMENTS

| | | | |
|---|---|---|---|
| 9,100,466 B2* | 8/2015 | Yemdji | H04M 3/002 |
| 9,172,791 B1* | 10/2015 | Ayrapetian | H04M 9/082 |
| 9,319,783 B1* | 4/2016 | Barton | H04M 9/082 |
| 10,477,031 B2* | 11/2019 | Schalk-Schupp | G10L 21/0264 |
| 2004/0264686 A1* | 12/2004 | Enzner | H04M 9/082 379/406.08 |
| 2008/0304675 A1 | 12/2008 | Roovers | |
| 2018/0367674 A1* | 12/2018 | Schalk-Schupp | G10L 21/0264 |

OTHER PUBLICATIONS

GEnz03: Enzner, G.; Vary, P., Robust and elegant, purely statistical adaptation of acoustic echo canceller and postfilter, 2003.

* cited by examiner

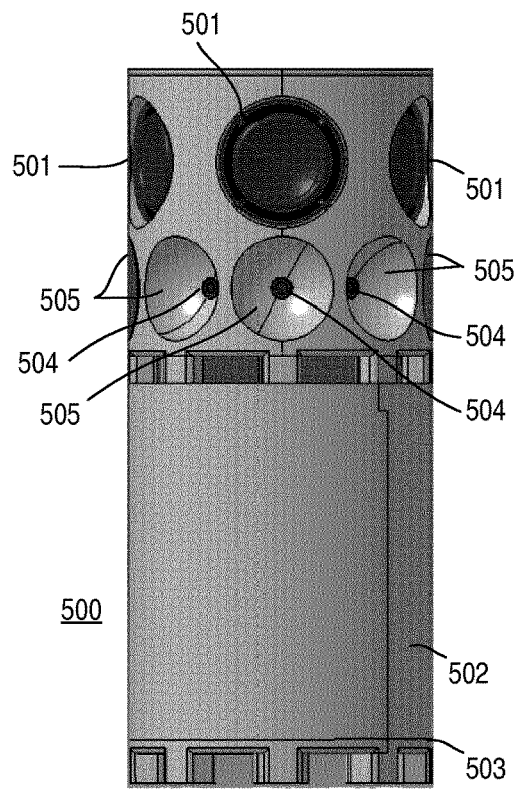
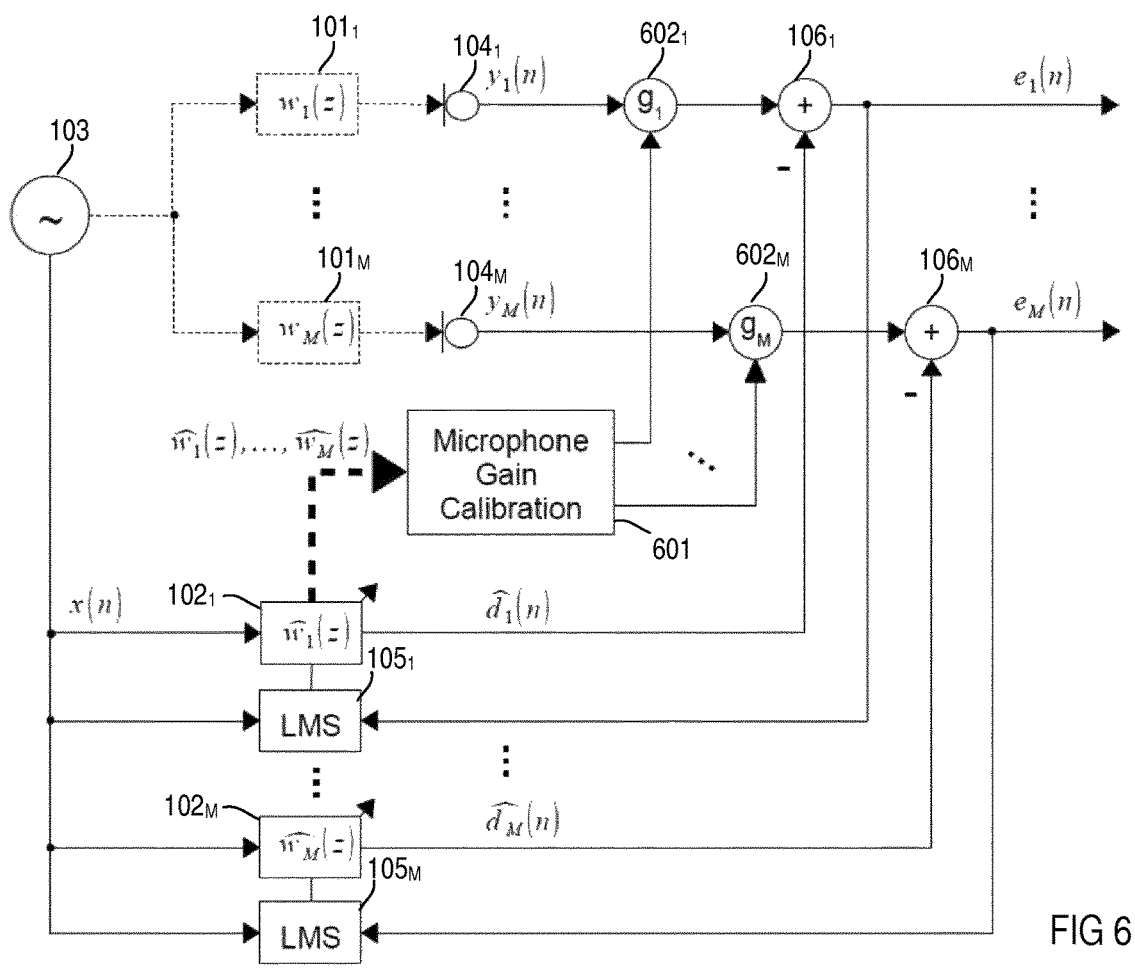
FIG 5
FIG 6

ACOUSTIC ECHO CANCELING

CROSS-REFERENCE TO RELATED APPLICATIONS

The present application is a national stage application of the international application titled, "ACOUSTIC ECHO CANCELING," filed on Dec. 8, 2017 and having serial number PCT/EP2017/081942, which claims priority benefit of European patent application titled, "ACOUSTIC ECHO CANCELING" filed Dec. 30, 2016 and having Ser. No. 16/207,449.6. The subject matter of this related application is hereby incorporated herein by reference.

BACKGROUND

1. Technical Field

The disclosure relates to a system and a method of acoustic echo canceling (generally referred to as "acoustic echo canceler").

2. Related Art

Suppressing, eliminating, or compensating for echo or reverberation effects while simultaneously transmitting and receiving acoustic signals, e.g., sound including music, speech, etc., is commonly referred to as acoustic echo cancellation (AEC). For example, during a call on hands-free telephones, the voice of a caller reaches from the loudspeaker to the microphone at a remote subscriber and is transmitted back to the caller who experiences echoes of his own voice while speaking. Echo cancellation is employed to reduce such undesired effects.

SUMMARY

A system for canceling acoustic echoes includes a microphone configured to pick up sound generated by a sound source and transferred from the sound source to the microphone via an unknown transfer path having an unknown transfer function, and to provide an electrical microphone signal therefrom. The system further includes an adaptive filter configured to approximate the unknown transfer function with an estimated transfer function and to filter an electrical signal representative of the sound generated by the sound source with the estimated transfer function to provide an estimated signal therefrom, the adaptive filter having an adaptive adaptation step size. The system further includes an adaptive post filter configured to filter a difference signal, which is the difference between the microphone signal and the estimated signal, with a post filter transfer function. The post filter transfer function is the difference between one and the adaptive adaptation step size, and the adaptive post filter is configured to have a minimum damping, the minimum damping being limited to a minimum threshold.

A method for canceling acoustic echoes includes picking up with a microphone sound generated by a sound source and transferred from the sound source to the microphone via an unknown transfer path having an unknown transfer function, and providing an electrical microphone signal therefrom. The method further includes approximating the unknown transfer function with an estimated transfer function of an adaptive filter and filtering an electrical signal representative of the sound generated by the sound source with the estimated transfer function to provide an estimated signal therefrom, the adaptive filter having an adaptive adaptation step size. The method further includes filtering a difference signal, which is the difference between the microphone signal and the estimated signal, with a post filter transfer function of an adaptive post filter. The post filter transfer function is the difference between one and the adaptive adaptation step size, and the adaptive post filter is configured to have a minimum damping, the minimum damping being limited to a minimum threshold.

Other systems, methods, features and advantages will be, or will become, apparent to one with skill in the art upon examination of the following detailed description and appended figures. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. In the figures, like referenced numerals designate corresponding parts throughout the different views.

FIG. 5 is a schematic diagram illustrating an exemplary device having a multitude of loudspeakers for creating an approximate, two-dimensional, isotropic wave-field, and a multitude of error microphones installed at the same device.

FIG. 6 is a signal flow diagram illustrating a multiple single-channel acoustic echo canceler with automatic microphone calibration.

DETAILED DESCRIPTION

Figure 1:
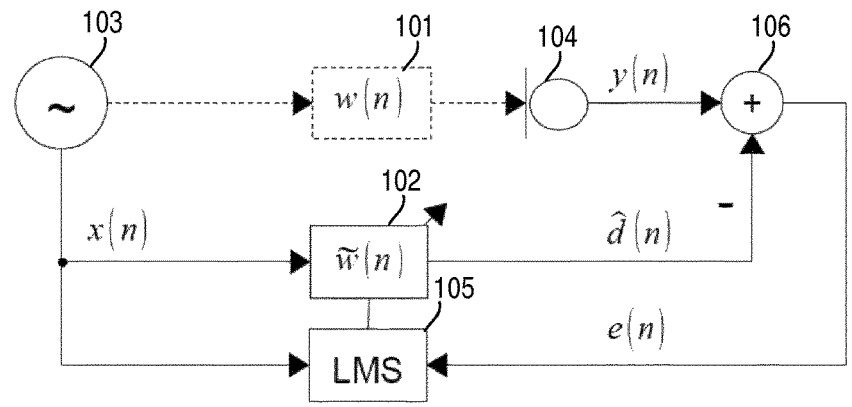
FIG. 1 is a signal flow diagram showing a basic acoustic echo canceler.

FIG. 1 is a signal flow diagram illustrating a basic adaptive system identification applicable in acoustic echo cancellation (AEC). For simplicity reasons, FIG. 1 refers to an acoustic echo canceler operating in the time domain but other acoustic echo cancelers, e.g., operating in sub-bands or in a frequency domain, are applicable as well. Acoustic echo cancellation can be attained, e.g., by subtracting from a total sound signal that includes echoes an estimated echo signal that represents an estimate of these echoes. To provide an estimate of the actual echo signal, algorithms may be utilized that operate in the time domain and that may employ adaptive digital filters for processing time-discrete signals. The employed adaptive digital filters may operate in such a way that the network parameters, which define the transmission characteristics of the filter, are optimized with reference to a predetermined quality function. A quality function is implemented, for example, by minimizing the average square errors of the output signal of the adaptive network with reference to a reference signal.

In the exemplary arrangement shown in FIG. 1, an unknown system 101 and an adaptive filter 102 operate in parallel. The unknown system 101 converts, according to its transfer function $w(n)$, an input signal $x(n)$ from a signal source 103 into a signal $y(n)$. The signal source 103 may be a loudspeaker and input signal $x(n)$ may be a signal supplied to and reproduced by the loudspeaker. Signal $y(n)$ may be an output signal of a microphone 104 that picks up sound reproduced by the loudspeaker and transferred via the unknown system 101 to the microphone 104. The adaptive filter 102 converts, according to its transfer function $\hat{w}(n)$, the input signal x(n) into a signal $\hat{d}(n)$. The signal y(n), which is the input signal x(n) distorted by the unknown system 101 having the unknown transfer function w(n), is considered a desired signal. The output of the adaptive filter 102, i.e., the signal $\hat{d}(n)$, is deducted from the input signal x(n) by the adaptive filter 102 under control of a filter controller 105 dependent on the input signal x(n) and an error signal e(n). Employing, e.g., the known Least Mean Square (LMS) algorithm, the filter controller 105 adjusts filter coefficients of the adaptive filter 102 in an iteration loop such that the error signal e(n), which is the difference between signal y(n) and signal $\hat{d}(n)$ as represented by a subtractor 106 in FIG. 1, is minimized. Thus, the signal $\hat{d}(n)$ approaches signal y(n) and the unknown transfer function w(n) is approximated by transfer function $\hat{w}(n)$ so that, in terms of cancellation, maximum elimination of the signal y(n), e.g., an echo signal, is attained by the signal $\hat{d}(n)$.

The LMS algorithm is based on the so-called method of the steepest descent (gradient descent method) and approximates the gradient in a simple manner. The algorithm operates in a time-recursive manner, that is, the algorithm runs over and over again with each new data set and the solution is updated correspondingly. Due to its minor complexity, its numerical stability and the low memory requirement, the LMS algorithm is eminently suitable for adaptive filters and for adaptive controls. Alternatively, the adaptation method may employ, for example, recursive least squares, QR decomposition least squares, least squares lattice, QR decomposition lattice or gradient adaptive lattice, zero forcing, stochastic gradient algorithms etc. Infinite Impulse Response (IIR) filters or Finite Impulse Response (FIR) filters may be used as adaptive filters in connection with the above adaptation algorithms.

Despite the fact that a time domain acoustic echo canceler has some benefits, such as a minimum consumption of memory and a low latency, there are also some drawbacks involved with the time domain operation, such as a low cancelling performance, high processor load and limited control of the algorithm. Other types of acoustic echo cancelers, e.g., those operating in sub-bands or in the frequency domain, may be more suited in some applications, and may dispose of a higher degree of flexibility, e.g., in order to control the adaptation step size or to employ an adaptive post filter (APF) that implements a residual echo suppression (RES) functionality. An efficient acoustic echo canceler is based on the known frequency domain adaptive filter (FDAF) structure which may use an overlap-save (OLS) method, acting as signal processing frame and may utilize an overlap of at least 50%.

Figure 2:
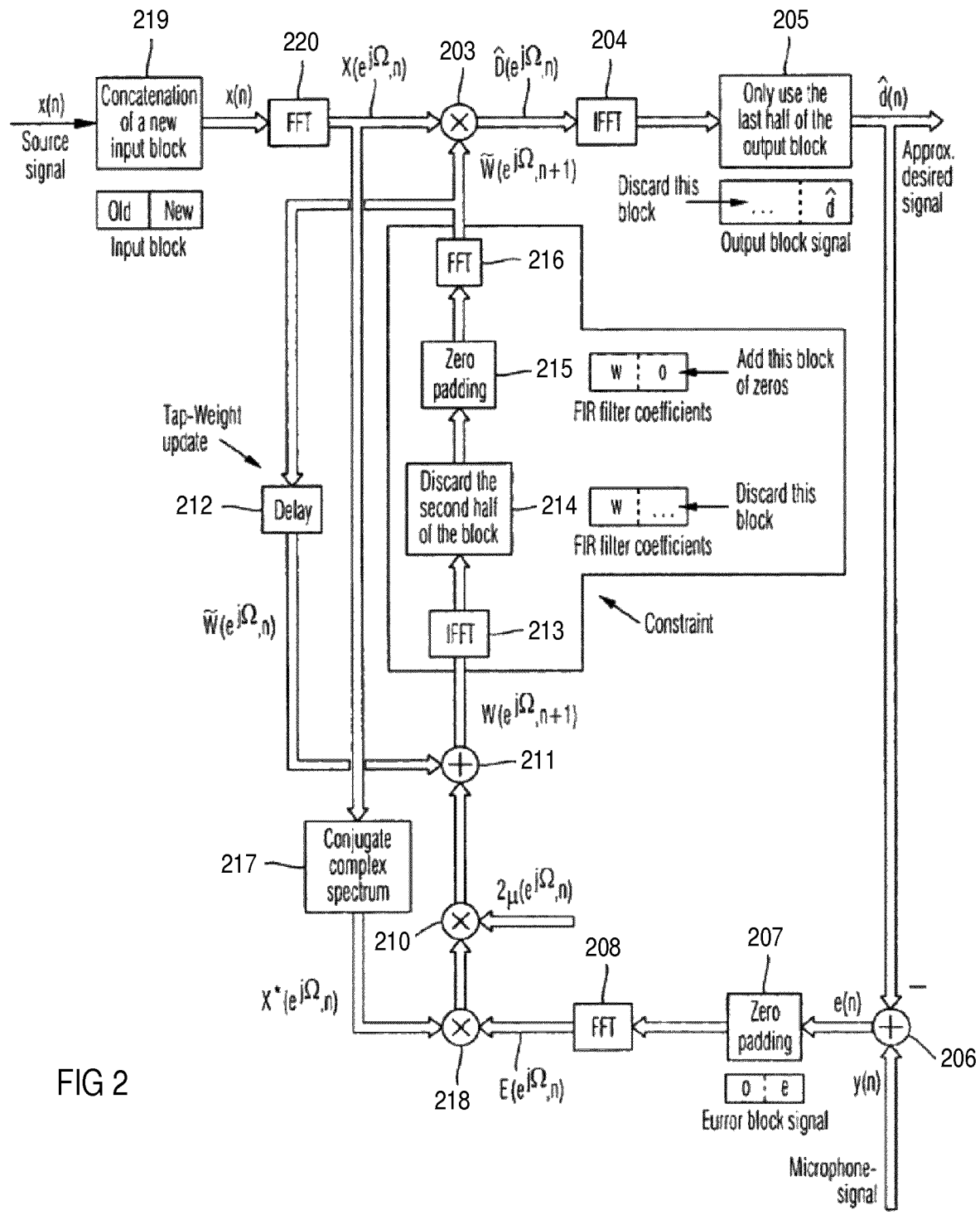
FIG. 2 is a signal flow diagram of an overlap-save based, frequency domain adaptive filter.

An acoustic echo canceler with an overlap-save based, frequency domain adaptive filter is shown in detail in FIG. 2. It should be noted that the latency between the input signal and the output signal can be controlled by the size of the overlap. High efficiency can be achieved if a minimum overlap of 50%, which is N/2 with N denoting the length of a fast Fourier transformation (FFT), is used. At the same time this also reflects the maximum possible latency of N/2 [Samples]. One can now freely choose the size of the overlap and hence adjust the system to the least acceptable latency and/or adjust to the available processing power, to find a good compromise between processing power and latency.

A Frequency Domain Block Least Mean Square (FBLMS) algorithm is a very efficient approach to implementing an adaptive filter in the frequency domain. The FBLMS algorithm may be implemented as an overlap-save algorithm or an overlap-add algorithm. The overlap-save algorithm can be implemented more efficiently than the overlap-add algorithm and is thus used in the acoustic echo cancelers described below. The acoustic echo canceler using the overlap-save FBLMS algorithm may include, according to FIG. 2, a functional block 219 for providing a new input block signal, a functional block 205 for using (in case of 50% overlap) the last half of the output block signal, a functional block 207 for filling with zeros, a functional block 214 for erasing the second half of the block, a functional block 215 for adding zeros, and a functional block 217 for forming a conjugated complex spectrum. Further, in the acoustic echo canceler, signal multipliers 203, 210 and 218, functional blocks for FFT 220, 208 and 216, two functional blocks for Inverse Fast Fourier Transformation (IFFT) 204 and 213, a delay unit 212, and two signal adders 206 and 211 are included.

The output of the functional block 219 provides a new input block signal that is supplied to the functional block 220 to execute an FFT. An output of the functional block 220 is supplied to the signal multiplier 203 and to an input of the functional block 217 to form a conjugated complex spectrum. An output of the signal multiplier 203 is supplied to the functional block 204 for IFFT, the output of which is supplied to the functional block 205 to use (in case of 50% overlap) the last half of the output block signal. The output of the functional block 205 is supplied to the signal adder 206, the output of which is supplied to the functional block 207 to fill (in case of 50% overlap) the first half of the block with zeros.

The output of the functional block 207 for filling (in case of 50% overlap) the first half of the block with zeros is supplied to the functional block 208 for FFT, the output of which is supplied to the signal multiplier 218. The output of the signal multiplier 218 is supplied to the signal multiplier 210. In turn, the output of the signal multiplier 210 is supplied to the signal adder 211. The output of the delay unit 212 is supplied to the other input of the signal adder 211 and is input to the functional block 213 for IFFT.

The output of the functional block 213 for IFFT is supplied to the functional block 214 to erase the last half of the block, the output of which is supplied to the functional block 215 to add zeros. The output of the functional block 215 for adding zeros to the last half of the block is supplied to the functional block 216 for FFT, the output of which is supplied to the other input of the signal multiplier 203. The output of the functional block 220 for FFT is also supplied to the functional block 217 to form a conjugated complex spectrum, the output of which is supplied to the other input of the signal multiplier 218.

The input of the functional block 219 for building a new input block signal receives the input signal x(n) and forms an input block signal, which, according to a chosen overlap, includes the signal portion of a previously processed signal block "old" and a signal portion of the currently received input signal x(n). This input block signal is supplied to the functional block 220 for FFT, at the output of which a signal $X(e^{j\Omega}, n)$, which is transformed into the frequency domain, is provided accordingly. This output signal $X(e^{j\Omega}, n)$ is supplied to the signal multiplier 203 as well as to the functional block 217 to form a conjugated complex spectrum.

The signal $\hat{D}(e^{j\Omega}, n)$ is supplied to the functional block 204 for IFFT by way of multiplying the signal $X(e^{j\Omega}, n)$ with an output signal $\tilde{W}(e^{j\Omega}, n)$ of the functional block 216 in the signal multiplier 203, whereby a corresponding output signal transformed into the time domain is formed at the output of the functional block 204. This output signal is subsequently supplied to the functional block 205 to use (in case of 50% overlap) the last half of the output block signal for further processing. In this functional block, the last half of the block signal (overlap is 50%) is used to build the signal $\hat{d}(n)$.

The output signal $\hat{d}(n)$ is supplied to the signal adder 206, the other input of which receives the signal y(n). The signal $\hat{d}(n)$ is subtracted from signal y(n) in the signal adder 206, whereby the error signal e(n) is formed at the output of the signal adder 206. The error signal e(n) is supplied to the functional block 207 to fill with zeros, so that the first half of this error block signal is filled with zeros (overlap is 50%, see functional block 219 for building the new input block signal).

The signal embodied in this manner at the output of the functional block 207 for filling with zeros is routed to the input of the functional block 208 for FFT, at the output of which the signal $E(e^{j\Omega}, n)$, which is transformed into the frequency range, is provided. In the subsequent signal multiplier 218, this signal $E(e^{j\Omega}, n)$ is multiplied with the signal $X^*(e^{j\Omega}, n)$, which emerges from the output signal $X(e^{j\Omega}, n)$ of the functional block 220 for FFT by appropriate processing in the functional block 217, to generate the conjugated complex spectrum. The signal emerging therefrom at the output of the signal multiplier 218 is subsequently supplied to the signal multiplier 210.

In the signal multiplier 210, this output signal is multiplied with $2\cdot\mu(e^{j\Omega}, n)$ wherein $\mu(e^{j\Omega}, n)$ corresponds to the time-and frequency dependent step size of the adaptive filter. The output signal of the signal multiplier 210 is subsequently added in the signal adder 211 to the signal $\tilde{W}(e^{j\Omega}, n)$. The signal $\tilde{W}(e^{j\Omega}, n)$ emerges from the output signal $\tilde{W}(e^{j\Omega}, n+1)$ of the functional block 216 for FFT by way of a corresponding delay which is implemented by the delay unit 212. The resulting output signal $W(e^{j\Omega}, n+1)$ of the signal adder 211 is supplied to the functional block 213 for IFFT, which accordingly provides an output signal, is transformed back into the time domain.

The second half of the block of filter coefficients of the FIR filter is discarded in functional block 214 and is substituted with coefficient values of zeros in functional block 215. By way of the functional block 216 the signal is, in turn, transformed into a signal in the frequency domain and is supplied to the signal multiplier 203 for multiplication with signal $X(e^{j\Omega}, n)$. The signal processing block embodied in the signal flowchart according to FIG. 2 by the functional block 213 for the IFFT, the functional block 214 for erasing the coefficients of the last half of the block, the functional block 215 for adding zeros, and functional block 216 for FFT are identified as "constraints" in response to the overlap save FBLMS algorithm.

In the present examples, the FBLMS algorithm comprises a standardized, frequency-selective, time variant adaptation step size $\mu(e^{j\Omega}, n)$. This adaptation step size $\mu(e^{j\Omega}, n)$ is normalized to the power density spectrum of the input signal $X(e^{j\Omega}, n)$. The normalization has the effect of compensating fluctuations of the amplitude of the input signal, which allows for adaptive filters to converge with a higher speed. This normalization has a positive effect due to the FBLMS algorithm in an acoustic echo canceler system and because a speech signal, which encompasses a distinct fluctuation in amplitude, is used as input signal. Conventional adaptive filters always encompass a slow convergence speed, which can be avoided in a simple manner by way of the normalization in the frequency domain.

Figure 3:
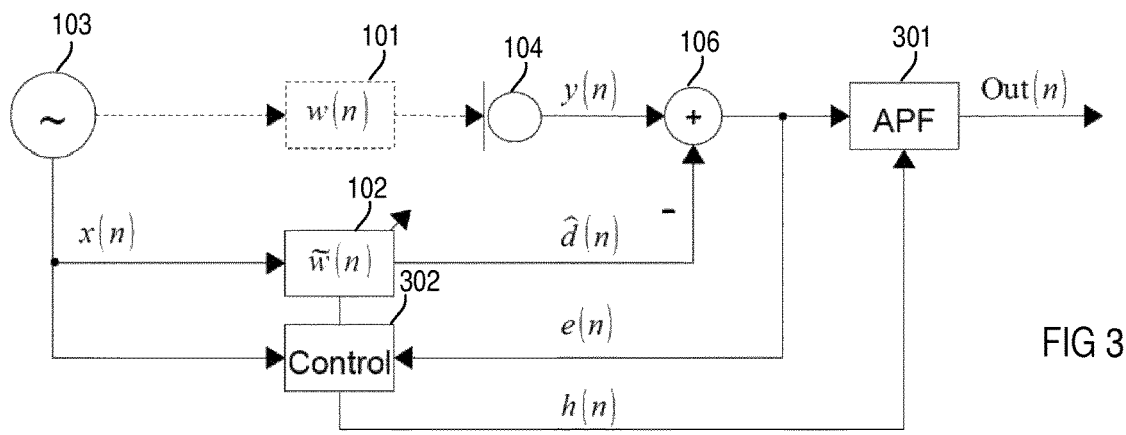
FIG. 3 is a signal flow diagram illustrating an acoustic echo canceler with adaptive post filter acting as residual echo suppressor.

Referring to FIG. 3, as the acoustic echo canceler shown in FIG. 1 is only capable of controlling the linear part of the unknown system, an additional APF 301 may be connected downstream of subtractor 106 in order to further reduce echoes originating, e.g., from non-linear parts of the unknown system 101. In situations when one wants to reduce echoes, such as signals radiated from a loudspeaker such as source 103 and picked-up with a microphone such as microphone 104, as is common e.g. in handsfree systems, handhelds or mobile devices, a problem occurs once the loudspeaker is driven beyond a certain upper level. In such a situation, non-linearities will inevitably be generated, mostly due to the loudspeaker, especially if it is a miniature one. Since non-linearities cannot be handled by a common acoustic echo canceler, so-called residual echoes will undesirably remain in the output signal. For this reason, a residual echo suppressor may be employed. The degree of non-linearities generated by the loudspeaker depends on the volume as well as on the content of the input signal.

In the exemplary acoustic echo cancelers described below, the residual echo suppressor is automatically adjusted to the current situation, e.g., to the energy content of the input signal and as such to the potential degree of created nonlinearities. Setting the residual echo suppressor to a fix, aggressive state would negatively influence the acoustic quality of the output signal, e.g., of the speech signal, especially in cases when no or only very little residual echoes are present. The acoustic echo cancelers are designed to keep the degree to which the residual echo suppressor will be used as low as possible, while adjusting its performance dependent on the current input signal energy. The acoustic echo cancelers do not require much processing power and memory.

An acoustic echo canceler may be operated in diverse undesired situations such as double talk or abrupt changes of the room impulse response (RIR), also referred to as secondary path. An adaptive control of the adaptation step size $\mu(e^{j\Omega}, n)$ can be described as follows:

$$\mu(e^{j\Omega},n)=\text{Dist}(e^{j\Omega},n)\text{SNR}(e^{j\Omega},n), \text{ wherein}$$

$\Omega$ is a normalized frequency (k/f$_s$) with k is a discrete frequency bin, n is a discrete time index, $\text{Dist}(e^{j\Omega}, n)$ is a time and frequency dependent, estimated system distance, and $\text{SNR}(e^{j\Omega}, n)$ is a time and frequency dependent, estimated signal to noise ratio.

In connection with a FDAF as shown in FIG. 2, a system and method for calculating an adaptive, adaptation step size $\mu(e^{j\Omega}, n)$ and an adaptive post filter based on a statistical approach similar to Gerald Enzner, Peter Varymay, "Robust and Elegant, Purely Statistical Adaptation of Acoustic Echo Canceler and Post Filter, International Workshop on Acoustic Echo and Noise Control (IWAENC2003), September 2003, Kyoto, Japan, is used which can be simplified as follows:

Step size:

$$\mu(e^{j\Omega_k}, n) = |G(e^{j\Omega_k}, n)|^2 \frac{|X(e^{j\Omega_k}, n)|^2}{|E(e^{j\Omega_k}, n)|^2},$$

$$\mu(e^{j\Omega}, n) = [\mu(e^{j\Omega_0}, n), \ldots, \mu(e^{j\Omega_{N-1}}, n)]^T$$

Post filter:

$$H(e^{j\Omega},n) = \mathbf{1} - \mu(e^{j\Omega},n), \text{ with } \mathbf{1} = [1, \ldots, 1]^T$$

System distance:

$$|G(e^{j\Omega}k,n+1)|^2 = |G(e^{j\Omega}k,n)|^2(1-\mu(e^{j\Omega}k,n)) + \Delta(e^{j\Omega}k,n)$$

with $\Delta(e^{j\Omega}k,n) = C|W(e^{j\Omega}k,n)|^2$, wherein C is a constant with which the double talk detection, respectively the speed of re-adaptation can be controlled.

The frequency and time dependent APF filter transfer function $H(e^{j\Omega}, n)$ is calculated, once the adaptive adaptation step size $\mu(e^{j\Omega}, n)$ is known, by subtracting the latter from one. Further, the system distance $G(e^{j\Omega}, n)$ may be estimated utilizing a purely statistical approach. With the tuning parameter C, the adaptation step size $\mu(e^{j\Omega}, n)$ can be controlled to better perform in double talk situations—the smaller C, the better the double talk detection (DTD) performance—or to enable the acoustic echo canceler to quickly re-adapt in the case of a rapid secondary path change. All these calculation steps may take place in a filter control block 302, which substitutes controller 105 used in the acoustic echo canceler shown in FIG. 1 and which controls filters 102 and 301.

The purpose of the adaptive post filter 301 is to suppress potential, residual echos, remaining within the output signal e(n) of the (linear) acoustic echo canceler. The acoustic echo canceler is in some respects similar to single channel noise reduction, e.g., in terms of frequency subtraction. Thus, the adaptive post filter 301 represents a non-linear signal processing stage which may create unwanted acoustical artifacts, for example, musical tones. A way to avoid artefacts is to limit the (frequency dependent) damping of the adaptive post filter 301 to a minimum threshold $H_{min}$, as shown below:

$$H(e^{j\Omega}k,n) = \max\{H(e^{j\Omega}k,n), H_{min}\}, \forall k=[0, \ldots, N-1].$$

If $H_{min}$ is set to values of approximately $H_{min} \geq -6$ [dB], fewer or even no acoustically disturbing artifacts will be generated, while at values of about $H_{min} \leq -9$ [dB] more acoustic artifacts may be perceived so that the minimum threshold $H_{min}$ that resides within this value range may be selected.

As already mentioned, the purpose of the adaptive post filter 301 is to suppress residual echoes which could otherwise not be reduced by the linear adaptive echo canceler, for example, due to nonlinearities of the unknown system. The most relevant, non-linear part within the unknown loudspeaker-enclosure-microphone (LEM) system is dependent on the utilized loudspeaker. Thereby it holds true that the higher the volume, i.e. the higher the excursion of the voice coil, the more probable it is that the loudspeaker will generate nonlinearities. In this respect, a volume setting (representing the amplitude of the input signal), or more generally, an input power (i.e., the power of the input signal) controlled, minimum threshold $H_{min}(p_x(n))$ may be employed, wherein $p_x(n)$ designates the estimated, time varying power of the input signal x(n) and $\alpha$ is a smoothing parameter ($\alpha \in [0, \ldots, 1[$):

$$p_x(n) = \alpha p_x(n-1) + (1-\alpha)x(n)^2.$$

Thereby, the input power controlled, minimum threshold $H_{min}(p_x(n))$ may be realized as follows:

$$H_{min}(p_x(n)) = \begin{cases} p_{xdB}(n) - p_{xdBTH} + H_{MinInit}, & \text{if } p_{xdB} > p_{xdBTH} \\ H_{MinInit}, & \text{else} \end{cases},$$

wherein $H_{MinInit}$ is a fix minimum threshold, independent of the input signal power,
$p_{xdB}(n) = 10 \log_{10}\{p_x(n)\}$ is an input signal power in [dB],
$p_{x\,dB\,TH}$ is a threshold for the input signal power in [dB].

This means, if the current input power $p_{xdB}(n)$ (in [dB]) remains below a certain input power threshold $p_{xdBTH}$, a fix minimum threshold $H_{MinInit}$ will be used for $H_{min}(p_x(n))$. Otherwise, the momentary threshold $H_{min}(p_x(n))$ will be determined based on the momentary input power $p_{xdB}(n)$, the minimum threshold $H_{MinInit}$ and the input power threshold $p_{xdBTH}$ in such a way that it will linearly rise (in the logarithmic domain), the higher the input power. Additionally, control of the minimum threshold $H_{min}(p_x(n))$ may not only be determined based on the power of the input signal, i.e., the input power $p_{xdB}(n)$, but also based on the spectral composition (spectrum) of the input signal. For example, the frequency dependent minimum threshold $H_{min}(p_x(n))$ of the post filter may be changed only in spectral ranges (frequency ranges) in which the corresponding spectral input power $p_{xdB}(n)$ rises. This may be performed in a switching mode, e.g., if the input power $p_{xdB}(n)$ exceeds a certain minimum input power, or in a sliding mode, e.g., according to a predetermined function, i.e., the input power $p_{xdB}(n)$ is converted in a minimum post filter threshold.

Figure 4:
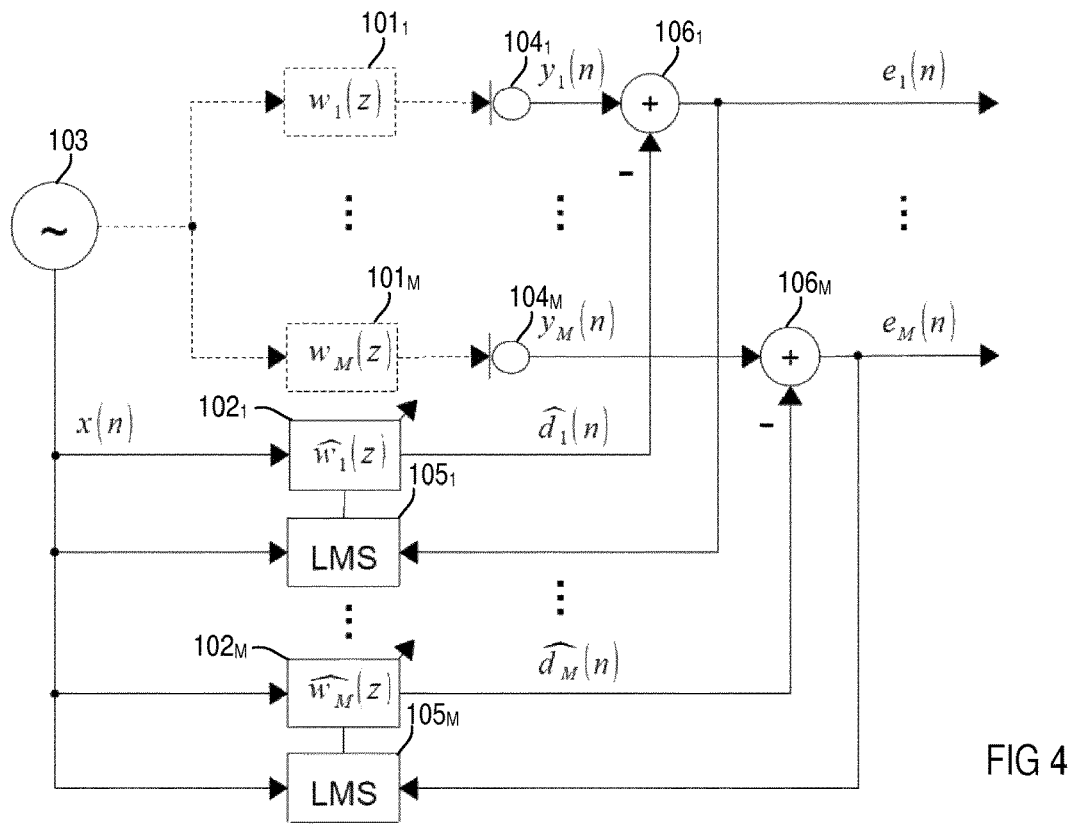
FIG. 4 is a signal flow diagram illustrating a basic multiple single-channel acoustic echo canceler.

FIG. 4 shows a multiple single-channel acoustic echo canceler utilizing a single channel reference signal (single loudspeaker playing back the mono input signal x(n) from signal source 103) and M>1 error microphones $104_1 \ldots 104_M$ acoustically coupled to source 103 via transfer functions $w_1(z) \ldots w_M(z)$ of unknown systems (paths) $101_1 \ldots 101_M$. As can be seen, in this case it is sufficient to employ the previously disclosed, single channel acoustic echo canceler as shown in FIG. 1, M times. The transfer functions $w_1(z) \ldots w_M(z)$ of the unknown systems (paths) $101_1 \ldots 101_M$ are approximated by adaptive filters $102_1 \ldots 102_M$ with transfer functions $\tilde{w}_1(z) \ldots \tilde{w}_M(z)$ under control of filter controllers $105_1 \ldots 105_M$ based on the input signal x(n) and error signals $e_1(n) \ldots e_M(n)$. The adaptive filters $102_1 \ldots 102_M$ provide signals $\hat{d}_1(n) \ldots \hat{d}_M(n)$ which are subtracted from output signals $y_1(n) \ldots y_M(n)$ of the unknown systems (paths) $101_1 \ldots 101_M$ by subtractors $106_1 \ldots 106_M$ to generate the error signals $e_1(n) \ldots e_M(n)$.

A situation as depicted in FIG. 4 occurs, for example, in mobile or hand-held devices, which have small dimensions and are able to fill a whole horizontal plane, or ideally a whole three-dimensional room with sound, i.e. to mimic an ideal, isotropic radiator. In this case, it is not important whether the device is able to playback stereo or multi-channel signals, such as 5.1 surround sound channels or the like, since the main focus is to create an ideal (mono) isotropic wave-field. In this special case, all speakers involved can be regarded as one virtual speaker (source 103) having a somewhat omnidirectional, cylindrical or spherical, radiation pattern. Microphones in the proximity of this virtual, omnidirectional source that have a similar distance to it would then, ideally, pick-up the same sound pressure level (SPL).

A device 500 that approximately fulfills the requirements outlined above is shown in FIG. 5. It includes, for example, five regularly distributed broadband speakers 501 (two not visible in FIG. 5) mounted at a cylindrical body 502 and a down-firing subwoofer 503 mounted at the bottom of the device (not visible in FIG. 5), and eight equiangularly distributed, omnidirectional microphones 504 (five not visible in FIG. 5), each located in the center of a cavity 505 mounted at the body 502 of the device 500. As can be seen, the distance of the layer where the speakers 501 are mounted at the cylindrical body 502, and the layer at which the microphones 504 are mounted in parallel, i.e. the distances between the microphones 504 and the virtual, cylindrical radiating speaker 501, are the same. "Regularly distributed"

means that the microphones are disposed or arranged according to an established rule or principle such as being equilaterally and/or equiangularly distributed with respect to each other. In contrast, "irregularly distributed" includes all other distributions such as random distributions.

Referring to FIG. 6, in connection with devices as shown in FIG. 5, the echo cancelling performance of an acoustic echo canceler and of potentially following stages, such as a beamformer, can be further improved by introducing a self-calibrating multi-microphone arrangement which can be integrated into the acoustic echo canceler depicted in FIG. 4. The self-calibrating multi-microphone arrangement may include (one or) a multiple of microphones $104_1 \ldots 104_M$, a microphone calibration block 601 and controllable gain blocks $602_1 \ldots 602_M$. The controllable gain blocks $602_1 \ldots 602_M$ are connected upstream of the subtractors $106_1 \ldots 106_M$ and are controlled by the microphone calibration block 601 dependent on signals $\hat{w}_1(z) \ldots \hat{w}_M(z)$ from filter control blocks $105_1 \ldots 105_M$. Thereby, once the multiple adaptive filters $102_1 \ldots 102_M$ have converged, which may, e.g., be indicated if the maximum of the power of the error signals max $\{p_e(n)\}$ with $p_e(n)=[p_{e1}(n), \ldots, p_{eM}(n)]$ and $p_{em}(n)$, $\forall m \in [1, \ldots, M]$, which are calculated in analogy to $p_x(n)=\alpha p_x(n-1)+(1-\alpha)\times(n)^2$, undercuts an adjustable lower threshold $p_{eTH}$, all current filter coefficient sets $\hat{W}_z(z)$, $\forall m \in [1, \ldots, M]$ will be used to calculate scaling values $g_m(n)$, $\forall m \in [1, \ldots, M]$ for M microphone signals $y_m(n)$, $\forall m \in [1, \ldots, M]$ as follows:

$$g_m(n) = \begin{cases} \frac{2}{MN} \sum_{m=1}^{M} \sum_{k=0}^{\frac{N}{2}} |W_m(e^{j\Omega_k}, n)|, & \text{if } \max\{p_e(n)\} < p_{eTH} \\ g_m(n-1), & \text{else} \end{cases}$$

The scaling or spectral tuning of the individual microphones may be performed only if it is ensured that the unknown transfer function between the one or more loudspeakers and the one or more microphones has been estimated with at least a minimum accuracy, e.g., if the estimated system distance has undercut a predetermined lower threshold. The system distance may be estimated as described in Gerald Enzner, Peter Varymay, "Robust and Elegant, Purely Statistical Adaptation of Acoustic Echo Canceler and Post Filter, International Workshop on Acoustic Echo and Noise Control (IWAENC2003), September 2003, Kyoto, Japan, or in E. Hänsler, G. Schmidt, "Topics in Speech and Audio Processing in Adverse Environment", Springer Verlag Berlin Heidelberg, 2008. In the case of non-spectral tuning, i.e., scaling (e.g., amplifying only), of the individual microphones additionally the power/energy in a certain spectral range (e.g., between 100 Hz and 500 Hz) may be used for determining the scaling values.

If only a single microphone (not shown) instead of a multiplicity of microphones $104_1 \ldots 104_M$ is used to pick up sound generated by the sound source 103 and transferred from the sound source 103 to the single microphone via an unknown transfer path having an unknown transfer function, and, thus, to provide only a single electrical microphone signal, the microphone calibration arrangement may individually attenuate or amplify the single electrical microphone signal dependent on a first reference signal that may represent a predetermined reference level or one or more desired (estimated) transfer functions. The first reference signal may be provided by a memory block (not shown) that stores and supplies the first reference signal.

If, however, a multiplicity of microphones $104_1 \ldots 104_M$ is used to pick up sound generated by the sound source 103 and transferred from the sound source 103 to the multiplicity of microphones $104_1 \ldots 104_M$ via a multiplicity of unknown transfer paths having a multiplicity of unknown transfer functions, and to provide a multiplicity of electrical microphone signals, the microphone calibration block 601 may individually, frequency dependently or independently attenuate or amplify, e.g., filter, the multiplicity of electrical microphone signals dependent on one or more second reference signals derived from one or more of the multiplicity of estimated transfer functions. The one or more second reference signals may represent one predetermined gain (frequency dependent or independent amplification or attenuation) or a multiplicity of predetermined gains. Alternatively, the one or more second reference signals may represent a mean of some or all of the multiplicity of estimated transfer functions or a selected one of the estimated transfer functions that serves as a reference for further adapting one, some or all of the other transfer functions to be estimated. For example, a single second reference signal may represent one of the estimated transfer functions other than the estimated transfer function corresponding to an electrical microphone signal to be filtered dependent on this single second reference signal.

Parts or all of the acoustic echo canceler circuitry may be implemented as software and firmware executed by a processor or a programmable digital circuit. It is recognized that any acoustic echo canceler circuit as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any acoustic echo canceler circuitry as disclosed may utilize any one or more microprocessors to execute a computer-program that is embodied in a non-transitory computer readable medium that is programmed to perform any number of the functions as disclosed. Further, any controller as provided herein includes a housing and a various number of microprocessors, integrated circuits, and memory devices, (e.g., FLASH, random access memory (RAM), read only memory (ROM), electrically programmable read only memory (EPROM), and/or electrically erasable programmable read only memory (EEPROM).

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third,"

etc. are used merely as labels, and are not intended to impose numerical requirements or a particular positional order on their objects.

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

The invention claimed is:

1. A system for canceling acoustic echoes comprising:
a microphone configured to pick up sound generated by a sound source and transferred from the sound source to the microphone via an unknown transfer path having an unknown transfer function, and to provide an electrical microphone signal therefrom;
an adaptive filter configured to approximate the unknown transfer function with an estimated transfer function and to filter an electrical signal representative of the sound generated by the sound source with the estimated transfer function to provide an estimated signal therefrom, the adaptive filter having an adaptive adaptation step size; and
an adaptive post filter configured to filter a difference signal being a difference between the microphone signal and the estimated signal with a post filter transfer function, wherein
the post filter transfer function is a difference between one and the adaptive adaptation step size; and
the adaptive post filter is configured to have a minimum damping, the minimum damping being limited to a minimum threshold.

2. The system of claim 1, wherein the adaptive filter is a frequency domain adaptive filter.

3. The system of claim 1, further comprising a filter control block that is configured to control the adaptive filter and the adaptive post filter.

4. The system of claim 3, wherein the filter control block is configured to evaluate an adaptation step size of the adaptive filter dependent on a statistical analysis of a system distance of the adaptive filter.

5. The system of claim 4, wherein the filter control block is configured to estimate the system distance of the adaptive filter dependent on a statistical analysis of the adaptive adaptation step size and a previously estimated system distance of the adaptive filter.

6. The system of claim 5, wherein
the estimated system distance of the adaptive filter is further dependent on a tuning parameter; and
the filter control block is further configured to control at least one of double talk detection and re-adaptation of the adaptive filter dependent on the tuning parameter.

7. The system of claim 6, wherein the filter control block is configured to control based on the tuning parameter whether the adaptation step size better performs in double talk situations or when re-adaptation of the adaptive filter is accelerated.

8. The system of claim 1, wherein the minimum threshold is configured to be controlled dependent on an estimate of power of the sound source.

9. The system of claim 8, wherein the minimum threshold is further configured to be controlled dependent on a spectrum of the sound source.

10. The system of claim 9, wherein the minimum threshold is configured to be controlled by a volume setting.

11. The system of claim 1, wherein the minimum damping of the adaptive post filter is frequency dependent.

12. A method for canceling acoustic echoes comprising:
picking up with a microphone sound generated by a sound source and transferred from the sound source to the microphone via an unknown transfer path having an unknown transfer function, and providing an electrical microphone signal therefrom;
approximating the unknown transfer function with an estimated transfer function of an adaptive filter and filtering an electrical signal representative of the sound generated by the sound source with the estimated transfer function to provide an estimated signal therefrom, the adaptive filter having an adaptive adaptation step size; and
filtering a difference signal being a difference between the microphone signal and the estimated signal with a post filter transfer function of an adaptive post filter, wherein
the post filter transfer function is a difference between one and the adaptive adaptation step size; and
the adaptive post filter is configured to have a minimum damping, the minimum damping being limited to a minimum threshold.

13. The method of claim 12, wherein the adaptive filter is a frequency domain adaptive filter.

14. The method of claim 12, further comprising controlling the adaptive filter and the adaptive post filter.

15. The method of claim 14, wherein a filter control block is configured to evaluate an adaptation step size of the adaptive filter dependent on a statistical analysis of a system distance of the adaptive filter.

16. The method of claim 15, further comprising estimating the system distance of the adaptive filter dependent on a statistical analysis of the adaptive adaptation step size and a previously estimated system distance of the adaptive filter.

17. The method of claim 16, wherein the estimated system distance of the adaptive filter is further dependent on a tuning parameter, with which at least one of double talk detection and re-adaptation of the adaptive filter is controlled.

18. The method of claim 17, wherein the filter control block is configured to control based on the tuning parameter whether the adaptation step size better performs in double talk situations or when re-adaptation of the adaptive filter is accelerated.

19. The method of claim 12, wherein the minimum threshold is configured to be controlled dependent on an estimate of power of the sound source.

20. The method of claim 19, wherein the minimum threshold is further configured to be controlled dependent on a spectrum of the sound source.

21. The method of claim 20, wherein the minimum threshold is configured to be controlled by a volume setting.

22. The method of claim 12, wherein the minimum damping of the adaptive post filter is frequency dependent.

* * * * *